(12) United States Patent
Weksler et al.

(10) Patent No.: US 8,880,792 B2
(45) Date of Patent: Nov. 4, 2014

(54) MEMORY WATCH

(75) Inventors: Arnold S. Weksler, Raleigh, NC (US);
Rod D. Waltermann, Rougemont, NC (US); John Carl Mese, Cary, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 190 days.

(21) Appl. No.: 13/350,307

(22) Filed: Jan. 13, 2012

(65) Prior Publication Data

US 2013/0185492 A1  Jul. 18, 2013

(51) Int. Cl.
*G06F 12/00* (2006.01)
*G06F 12/02* (2006.01)

(52) U.S. Cl.
CPC ............... *G06F 12/00* (2013.01); *G06F 12/02* (2013.01)
USPC ........... 711/105; 711/154; 711/170; 711/171; 711/172; 711/E12.002; 711/E12.08; 711/E12.081; 711/E12.084; 711/E12.089

(58) Field of Classification Search
CPC ....... G06F 3/0679; G06F 12/00; G06F 12/02; G06F 3/061; G06F 12/0638; G06F 12/0646; G06F 12/0223; G06F 3/0653; G06F 12/06
USPC .......... 711/105, 154, 170, 171, 172, E12.002, 711/E12.08, E12.081, E12.084, E12.089
See application file for complete search history.

(56) References Cited

U.S. PATENT DOCUMENTS

| | | | | |
|---|---|---|---|---|
| 5,471,581 A * | 11/1995 | Munier et al. | ................ | 711/156 |
| 7,617,371 B2 * | 11/2009 | Fujimoto et al. | ............... | 711/165 |
| 2010/0325381 A1 * | 12/2010 | Heim | ............................. | 711/170 |
| 2013/0007343 A1 * | 1/2013 | Rub et al. | ...................... | 711/103 |

* cited by examiner

*Primary Examiner* — Midys Rojas
(74) *Attorney, Agent, or Firm* — Brian J. Pangrle (57) ABSTRACT

A method can include receiving memory configuration information that specifies a memory configuration; receiving memory usage information for the memory configuration; analyzing the received memory usage information for a period of time; and, responsive to the analyzing, controlling notification circuitry configured to display a graphical user interface that presents information for physically altering a specified memory configuration. Various other apparatuses, systems, methods, etc., are also disclosed.

20 Claims, 10 Drawing Sheets

Example Class 410

Class OSZ_OperatingSystem,
   Property FreePhysicalMemory strComputer = "."

Set objZZZService = GetObject("Zmgmts:" _
  & "{impersonationLevel=impersonate}!\\" _
  & strComputer & "\root\cimv2")
Set colSettings = objZZZService.ExecQuery _
  ("Select * from OSZ_OperatingSystem")
For Each objOperatingSystem in colSettings
  Zscript.Echo "Available Physical Memory: " & _
    objOperatingSystem.FreePhysicalMemory
Next

Example Class 420

Class Computer.info
  Property AvailablePhysicalMemory
  Property TotalPhysicalMemory Ex: " My.Computer.Info.TotalPhysicalMemory"

Example Class 430 class OSZ_LogEvent
{
| | |
|---|---|
| uint16 | Category; |
| string | CategoryString; |
| string | ComputerName; |
| uint8 | Data[]; |
| uint16 | EventCode; |
| uint32 | EventIdentifier; |
| uint8 | EventType; |
| string | InsertionStrings[]; |
| string | Logfile; |
| string | Message; |
| uint32 | RecordNumber; |
| string | SourceName; |
| datetime | TimeGenerated; |
| datetime | TimeWritten; |
| string | Type; |
| string | User; |

};

Memory Management Modules 450

| Logic 452 | Message(s) 454 | Time(s) 456 | User(s) 458 |
|---|---|---|---|
| UI(s) 462 | Communication 464 | Storage 466 | Other 468 |

MEMORY WATCH

TECHNICAL FIELD

Subject matter disclosed herein generally relates to techniques for monitoring memory.

BACKGROUND

Various devices such as computers, tablets, phones, etc., include memory that may be, at times, insufficient. Devices that rely on random access memory (RAM) may or may not have other types of memory or storage to alleviate issues stemming from insufficient RAM. For example, many computers include a hard drive, whether a disk drive or a solid-state drive, that can be used for writing information from RAM to free up some of the RAM. One memory management process is referred to as "paging", which involves storing information from RAM, as "main memory" or "primary memory", to a "secondary" storage (or a "tertiary" storage) in the form of "pages". Paging may be part of a "virtual memory" strategy for managing memory of a device. Paging performs tasks such as book keeping, "page in" (to transfer a page from a drive to RAM) and "page out" (to transfer a page from RAM to the drive). Such tasks require time and place demands on resources, which may diminish user experience or, more generally, performance of a device (e.g., latency of a drive may be several orders of magnitude greater than latency of RAM). As described herein, various technologies, techniques, etc., can monitor memory and optionally issue notifications, for example, to enhance user experience, device performance, etc.

SUMMARY

A method can include receiving memory configuration information that specifies a memory configuration; receiving memory usage information for the memory configuration; analyzing the received memory usage information for a period of time; and, responsive to the analyzing, controlling notification circuitry configured to display a graphical user interface that presents information for physically altering the specified memory configuration. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Various technologies, techniques, etc., are described herein that pertain to memory for a device such as a notebook computer, a tablet, a smart phone, etc. As an example, a method can include receiving memory configuration information that specifies a memory configuration of a device; receiving memory usage information for the memory configuration of the device; analyzing the received memory usage information for a period of time; and, responsive to such analyzing, controlling notification circuitry configured to display a graphical user interface that presents information for physically altering a specified memory configuration of the device. Such a method may notify a user (e.g., by issuing a notification) that more memory could improve performance of the device, for example, based on actual memory usage.

As an example of a scenario where the aforementioned method may find benefit, consider a device that includes the WINDOWS® "Task Manager", an application included with some WINDOWS® operating systems (OSs) that provides information about computer performance, running applications, processes, CPU usage, commit charge, memory, network activity and statistics, logged-in users, and system services. If the device is using most of its available memory, its OS will typically release memory by writing the least used memory contents to a pagefile on a drive (e.g., secondary storage, etc.). As memory is required, the pagefile is again written to. As mentioned, paging tends to cause a degradation of system performance (e.g., where drive I/O is much less efficient than RAM I/O). Further, as virtual memory address space is mapped to physical memory on demand, RAM tends to appear fully utilized according to the Task Manager application (e.g., all the time). Under such circumstances, the aforementioned method may acquire memory usage information (e.g., using a threshold that is less than a paging threshold), analyze the information and, based on such an analysis, issue a notification to inform a user (or other) that physically altering device memory may be beneficial. In other words, a user would not need to invoke and decipher information presented by the Task Manager application (e.g. the Task Manager GUI) in an attempt to determine whether adding more physical memory would be possible or beneficial. Such a method may optionally be implemented in situations where paging has been disabled (e.g., no page file exists).

As an example, a method may include implementing a performance monitoring tool of an OS (e.g., consider the WINDOWS® Performance Monitor, which can examine how programs affect performance, both in real-time and by collecting log data for later analysis). In such an example, the method may cause the tool to start a data collection routine that monitors available bytes in memory, to log an event when the available bytes are less than X % (e.g., 10% or other value) of the total memory available and to log an event when the available bytes are greater than Y % (e.g., 10% or other value). The tool or the method may provide for time stamping of log events (e.g., a time value). Given such memory usage information, the method can determine how long a low memory situation existed. Further, after having multiple occasions of a low memory situation(s) or, for example, after deciding longevity (e.g., duration) of a low memory situation(s), the method can issue an alert, for example, to inform a user that adding more memory is likely to be beneficial.

As a specific example, consider a WINDOWS® OS that includes the WINDOWS® Management Instrumentation (WMI) infrastructure for management of data and operations. The WMI infrastructure allows for execution of scripts or applications to automate administrative tasks on local or remote computers and to supply management data to other parts of the OS. In this particular example, a method can include executing a script, application, etc., for obtaining total physical memory values and taking a selected threshold (e.g., 85%) as a value for purposes of monitoring. The method may periodically sample available memory (e.g., via a monitoring tool within the WMI infrastructure) to monitor when memory utilization exceeds the selected threshold. The method may instruct the infrastructure to log an event when the threshold is exceeded (e.g., capturing at least the time and optionally a date). The method may include analyzing logged events, for example, based on a number of events over a time interval, duration of exceeded thresholds over a given time, etc., and issuing a notification via an interface (e.g., video, sound, vibration, electronic communication, etc.) that indicates that adding more memory will improve system performance.

Figure 1:
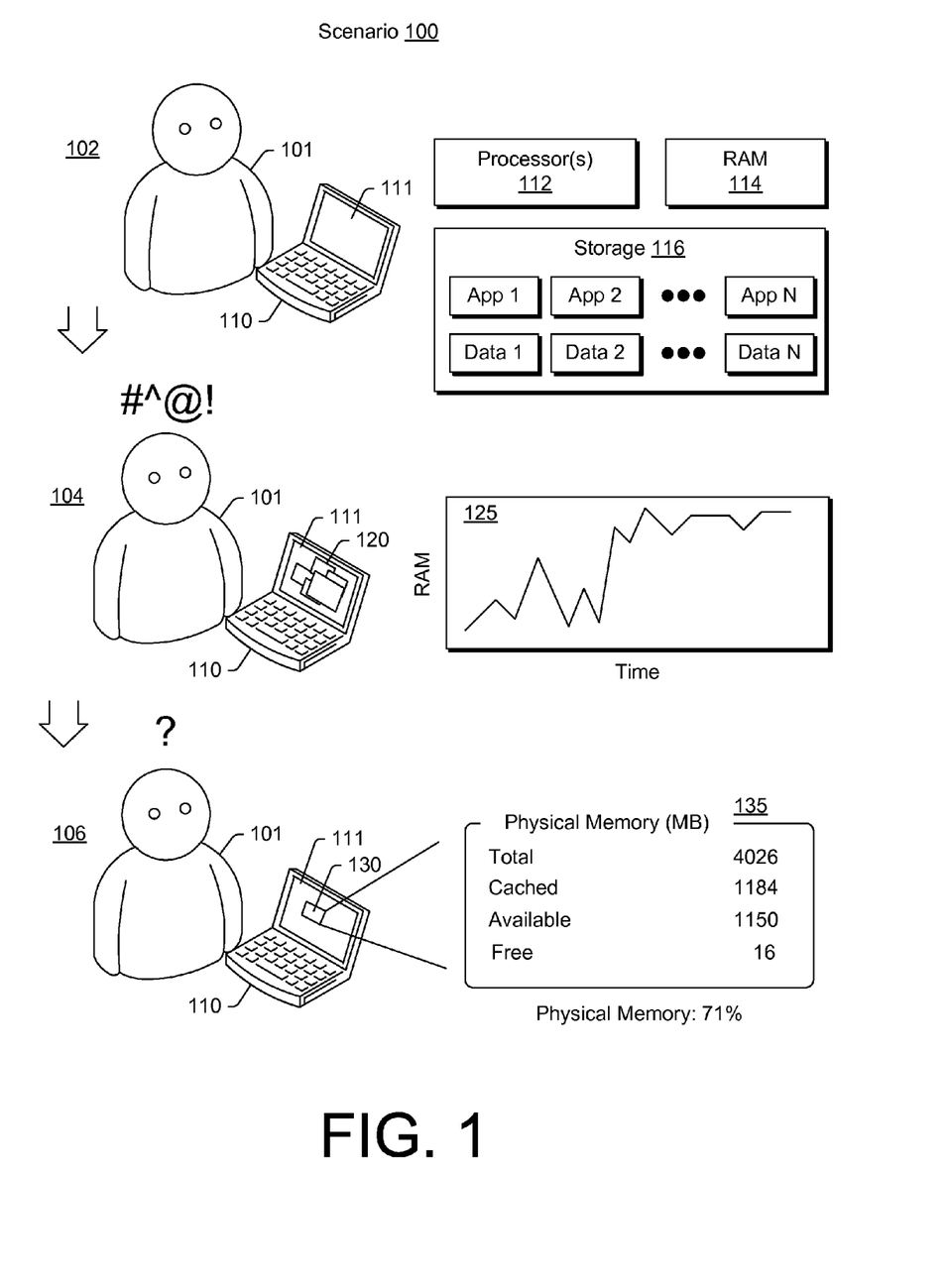
FIG. 1 is a diagram of an example scenario illustrating a memory usage issue.

FIG. 1 shows an example of a scenario 100 experienced by a user 101 using a device 110 that unfolds with respect to time. At a time 102, the user 101 commences use of the device 110, which includes a display 111, one or more processors 112 (e.g., CPUs, GPUs, etc.), RAM 114 accessibly by the one or more processors 112 and storage 116, which may be secondary storage, tertiary storage, etc., and optionally configured to store a page file for purposes of paging. As shown, the storage 116 may be local, remote or both local and remote storage may be provided. In the example of FIG. 1, the storage 116 stores various applications and data.

At time 104, the user 101 has loaded one or more applications and data from storage such as the storage 116 for execution by the device 110. The one or more applications and data may be invoked as single instances, multiple instances, etc., as represented by various user interfaces (UIs) 120 on the display 111 of the device 110. For example, the user 101 may invoke a browser application that loads large video files via the Internet where the browser application has a video plug-in for performing decoding of compressed video files for rendering to a display 111 of the device 110. As another example, the user 1010 may invoke a game application that renders detailed three-dimensional scenes at a high-frame rate. Such processes may be resource intensive and cause the device 110 to use most of its RAM 114 and to implement paging (e.g., writing information from the RAM 114 to the storage 116). As indicated, the user 101 may become frustrated by the performance of the device 110, as videos glitch, a game stutters, etc. Such issues may stem from paging, especially where paging has led to excessive drive fragmentation (e.g., use of a device with insufficient memory can over time compound performance problems).

At time 106, the user 101, who knows a little about computers, resorts to invoking a task manager application 130 (e.g., entering a CTRL-ALT-DEL key command and selecting "Start Task Manager"). Clicking on a "Performance" tab, the application 130 renders a GUI 135 to the display 111. The user 101, with his little knowledge, is confused as he cannot decipher the various types of memory or what they mean in terms of the poor performance experienced at time 104. For example, the user 101 may think "What does 'Physical Memory: 71%' mean?" or "Seems like I have adequate memory available?". Given his limited knowledge, the user 101 does not readily know what to do to address the poor performance experience.

Figure 2:
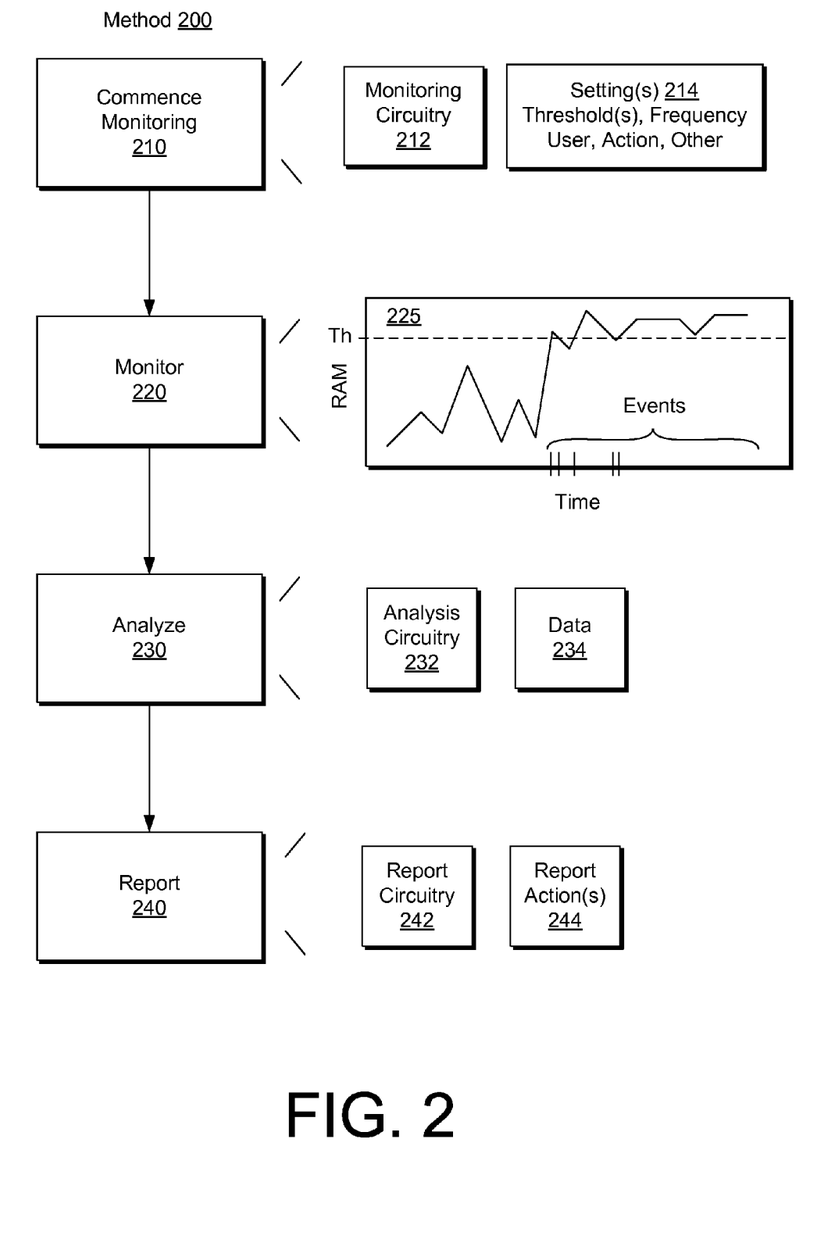
FIG. 2 is a diagram of an example of a method for monitoring memory usage.

FIG. 2 shows an example of a method 200, along with various circuitry, information, etc. In a commencement block 210, the method 200 commences monitoring, for example, via monitoring circuitry 212 that operates according to one or more settings 214, which may be predetermined, user selectable, adjusted via learning, etc. As an example, the one or more settings 214 can include a threshold that corresponds to a memory usage value, percentage, fraction, etc., optionally referenced with respect to a total amount of installed memory of a device (e.g., a specified physical memory configuration of a device). The commencement block 210 may respond at boot, wake-up, etc., and commence the method 200. In a monitor block 220, the method 200 includes monitoring memory usage for some period or periods of time, for example, as indicated in a plot 225 of RAM versus time, which is shown as including a threshold (e.g., a constant threshold for the time of the plot 225) and various events (e.g., times associated with crossing the threshold). Thus, as an example, the monitor block 220 may collect memory usage information with respect to time where such information may optionally be in the form of logged events. In an analysis block 230, the method 200 includes analyzing memory usage, as monitored, for example, using analysis circuitry 232 and data 234. As to the data 234, they may include logged event data, sampled data, etc. The data 234 may include local, remote or local and remote data. The analysis circuitry 232 may analyze the data 234 using one or more analysis algorithms. As an example, an algorithm may determine one or more of a number of events for a given time, duration of memory usage above a threshold for a given time (e.g., time between an up and down threshold crossing events), average memory usage for a given time, etc. In a report block 240, the method 200 includes reporting on memory usage, for example, by using report circuitry 242, which may implement one or more report actions 244 (e.g., a trigger command, a script initiation command, etc.).

Figure 3:
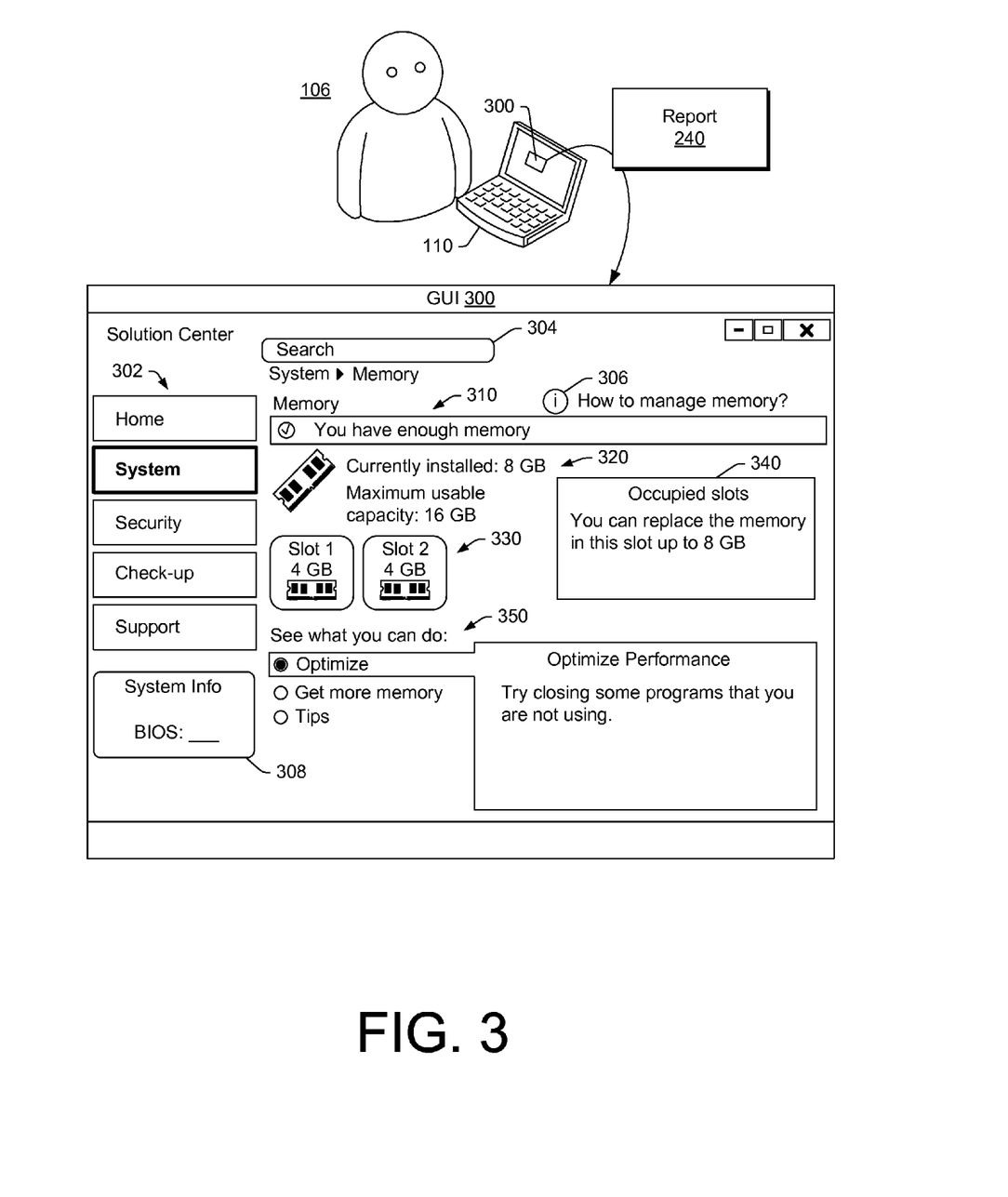
FIG. 3 is a diagram of an example of a graphical user interface for reporting information related to memory.

The method 200, if implemented in the scenario 100 of FIG. 1, may provide the user 101 with a report, for example, by displaying a graphical user interface that presents information for physically altering a specified memory configuration. FIG. 3 shows an example of such a report or notification in the form of a graphical user interface (GUI) 300.

The GUI 300 is shown as a 2-D visual rendering as may appear on a screen (e.g., display, projection, etc.) based, for example, on instructions in a mark-up language (e.g., HTML) or other format. Such instructions may optionally adhere to a style sheet language (e.g., CSS). As an example, data, logic, instructions, etc., may be determined by the report block 240 to cause rendering of the GUI 300, which may render image data, graphics via graphics processing, etc.

In the example of FIG. 3, the GUI 300 includes various fields or graphics, which may optionally respond to user input (e.g., via a pointing device, voice command, touch, etc.). For example, the GUI 300 includes various navigation graphics 302 (e.g., where a "System" graphic is active), a search field 304, an informational graphic 306, a system information graphic 308, a field indicating a general assessment 310 (e.g., "You have enough memory"), a field for installed and maximum memory 320, graphics for memory slot information 330, a field for information as to memory slots 340 (e.g., "you can replace the memory in this slot up to 8 GB"), and a graphic with one or more selectable options 350. In the example of FIG. 3, the option "Optimize" is selected and a field presented with information as to optimizing performance (e.g., "try closing some programs that you are not using"). As shown, other options include a memory upgrade option (e.g., "Get more memory") and an information option (e.g., "Tips").

As an example, notification circuitry (e.g., report circuitry 242 of FIG. 2) may be configured to display the GUI 300, which presents information for physically altering a specified memory configuration. In this example, a specified memory configuration may be "Slot 1, 4 GB" and "Slot 2, 4 GB". Information for physically altering a specified memory configuration may be, for example, "cannot alter, at maximum capacity", "replace memory in Slot X or Y with Z GB", "insert memory in empty Slot X", "replace memory in Slots X and Y with Z GB", etc.

In the example of FIG. 3, the memory upgrade option may, upon selection, initiate Internet navigation to a website where appropriate memory may be purchased, ordered, etc. For example, upon selection of the memory upgrade option, information may be communicated to an Internet store and input into an application programming interface of the Internet store, search engine, etc., such that the Internet navigation navigates to a webpage of the Internet store that includes information for one or more memories that would be appropriate for memory upgrade. Further, such a method may include manufacturer information for the device (e.g., the notebook computer 110) or other information (e.g., a valued customer ID) that can apply a coupon, discount, program award, etc., for purchase of memory. Accordingly, report circuitry (e.g., for notification) may transmit information via an Internet connection to assist a user in purchasing memory, for example, in response to a determination that more memory could enhance performance. As an example, a GUI may include an option for a user to input one or more credentials, favorite vendors, website URLs, etc., to assist a user in enhancing performance of her device (e.g., "Support" option may provide one or more fields, controls, etc., that allow a user to input, discover, authorize, etc., appropriate information, actions, etc.). As an example, a GUI may optionally display advertisements, coupons, etc., for purchase of memory where activating a link (e.g., clicking on a graphic) navigates to an Internet store.

Figure 4:
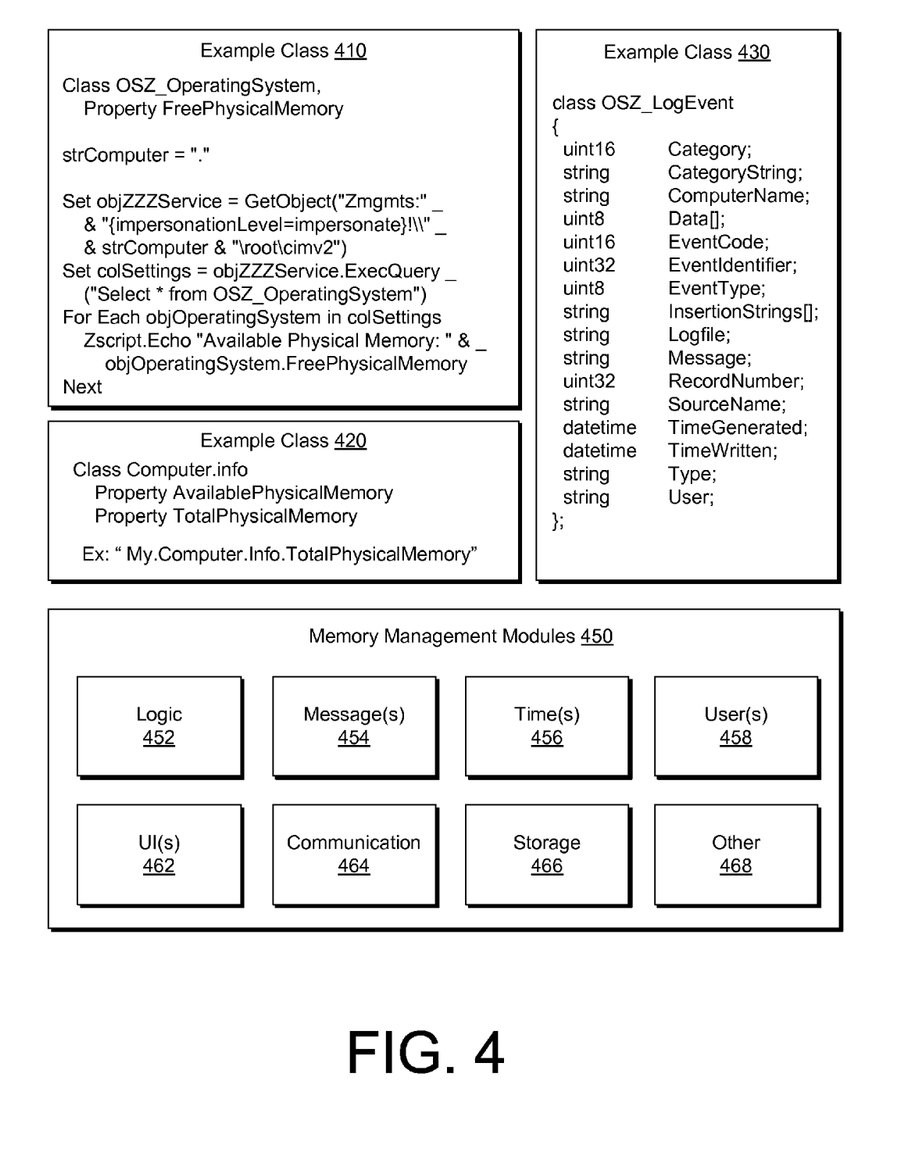
FIG. 4 is a diagram of examples of classes and memory management modules.

FIG. 4 shows example classes 410, 420 and 430 as well as some examples of memory management modules 450. Such classes, modules, other techniques, etc., may be implemented for purposes of monitoring memory. As to the example class 410, an operating system class includes one or more properties such as a "FreePhysicalMemory" property. Script, code, etc., may be written or provided that invokes the class using a property to return a value (e.g., representing free physical memory, etc.). As to the example class 420, a computer.info class includes one or more properties such as an "AvailablePhysicalMemory" property and a "TotalPhysicalMemory" property. As an example, script, code, etc., may be written or provided that invokes the class using a property to return a value (e.g., representing available memory, total memory, etc.). As to the example class 430, a log event class may include one or more properties such as those shown in FIG. 4. For example, the log event class may be invoked using script, code, etc., such that a value is returned for a property that may include a date and a time. As shown in FIG. 4, information such as messages, event type, computer name, user, etc., may be returned by invoking a class. Such classes may optionally be in the form of object classes, for example, as in an object-oriented programming framework. Such classes may optionally be provided as features of an operating system. Such classes may optionally be invoked for a local device, a remote device, local and remote devices, etc.

As to the memory management modules 450, these may include a logic module 452, a message module 454, a time module 456 (e.g., optionally for date as well as time), a user module 458, a UI module 462, a communication module 464, a storage module 466 and one or more other modules 468. Referring to FIG. 2, the circuitry (e.g., 212, 232 and 242) may optionally include one or more of the modules 450. Such modules may also include script, code, etc., that can invoke one or more classes (e.g., using one or more properties) to cause monitoring, analyzing, reporting, notifying, etc. As an example, where a device is used by more than one user, by invoking a class that includes a "User" property, memory usage information may be analyzed, reported, etc., on a user-by-user basis. Consider a brother (User 1) and a sister (User 2) where the sister plays a game that demands a lot of memory. An analysis may determine that User 2 is using much more memory than User 1 and issue a report via email to a responsible parent that the device could benefit from a memory upgrade (or that User 2 should consider using a different device, e.g., where its memory is at capacity).

Figure 5:
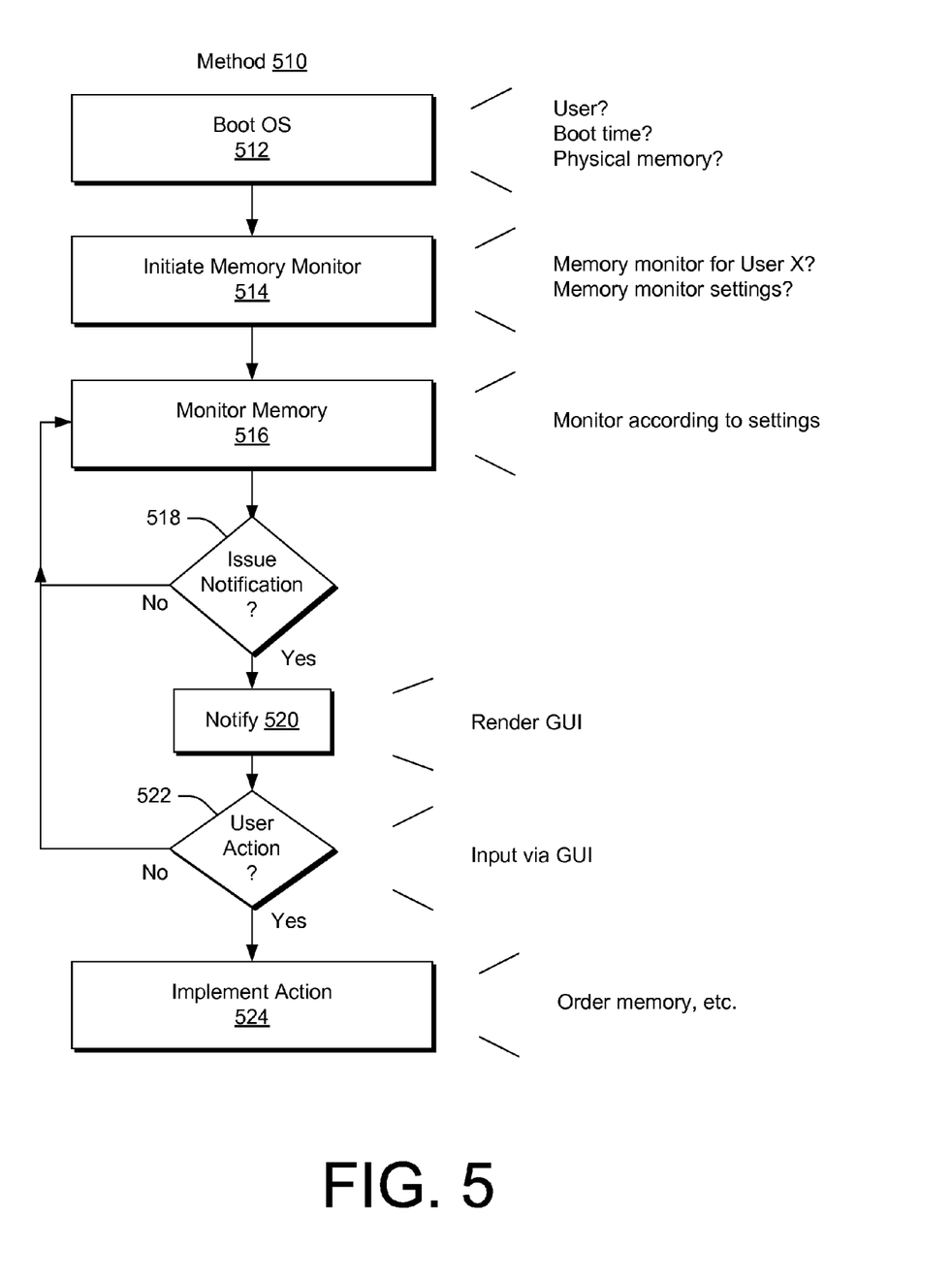
FIG. 5 is a diagram of an example of a method.

FIG. 5 shows an example of a method 510 that includes a boot block 512 for booting an OS on a device, an initiation block 514 for initiating a memory monitor, and a monitor block 516 for monitoring memory (e.g., using the memory monitor). As shown in the example of FIG. 5, a decision block 518 follows the monitor block 516 to decide whether the method 510 should issue a notification (e.g., as to memory usage). Where the decision block 518 decides that no notification should be issued, the method 510 continues at the monitor block 516. However, if the decision block 518 decides that a notification should be issued, then a notification block 520 provides for issuing a notification (e.g., via a GUI or other mechanism). In such a manner, notification circuitry may be controlled. Another decision block 522 follows that decides if user action has been received in response to the issued notification. If the decision block 522 decides that no user action has been received (e.g., to take particular action with respect to memory), then the method 510 continues at the monitor block 516. However, if the decision block 522 decides that user action has been received, the method 516 continues at an implementation block 524 that may implement action (e.g., present information, navigate to a website, send a communication, shut down a device for memory installation, etc.).

Figure 6:
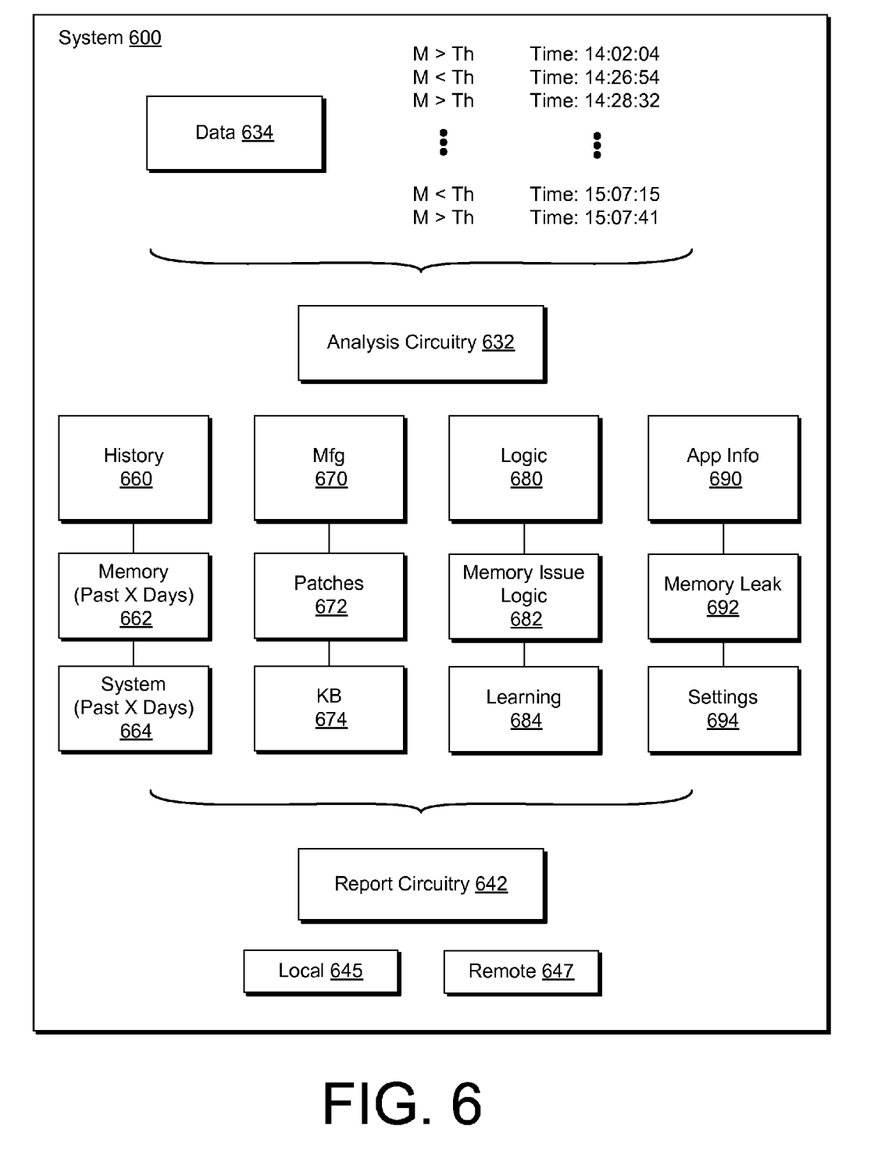
FIG. 6 is a diagram of an example of a system.

FIG. 6 shows an example of a system 600 that includes analysis circuitry 632 to analyze data 634 and report circuitry 642 to provide one or more reports, whether local 645, remote 647 or local 645 and remote 647. In the example of FIG. 6, the data 634 includes time data for memory crossing a threshold (Th). Such data may optionally be collected using monitoring circuitry. Such data may be provided by a device, via a network connection, etc. Such data may optionally pertain to more than one user, more than one device, etc. For example, the data 634 may include additional data, optionally indicating user, device, applications, memory configuration, etc.

The analysis circuitry 632 can include one or more of a history module 660, a manufacturing module 670, a logic module 680 and an application information module 690. Such modules may be implemented to analyze the data, optionally providing additional data. For example, the history module 660 may include memory data 662 and system data 664. The manufacturer module 670 may include information as to patches 672 (e.g., BIOS, OS, etc.) and knowledge base (KB) information 674, which may indicate types of memory usage issues and possible solutions or tips to improve performance.

Further, the manufacturer module 670 may provide information as to resetting one or more settings associated with the analysis circuitry 632 in response to a change in configuration of physical memory of a device. Such information may optionally be provided or determined, for example, via access to system information and comparing system information to stored information for the system to determine if a change has occurred.

The logic module 680 may include logic for memory issues 682 and learning logic 684 (e.g., to learn from user selections, user usage of a device, etc.). As an example, the learning logic 684 may learn that memory usage impacts performance when a user uses an application X and an application Y concurrently. Such logic may allow the analysis circuitry 632 to determine that memory usage will not impact performance if the user uses only one of these applications at a time. In turn, the report circuitry 642 may issue a notification that notifies the user to use only one of application X or application Y at a time to improve performance (e.g., as a tip).

As to the application information module 690, such information may include memory leak information 692 and settings information 694. For example, various web browser applications have been known to experience memory leakage (e.g., memory not released after usage, excessive caching, etc.). Such memory leaks can, at times, consume a gigabyte or more of memory. Where the analysis circuitry 632 has access to such information, it may inform the report circuitry 642 to report the application to a user (e.g., application Z has memory leak issues, settings XY recommended). In such a manner, the analysis circuitry 632 may ascertain whether a memory usage pattern, trend, etc., is actually due to an application or improper settings with respect to an application.

As indicated, the report circuitry 642 may include capabilities to report locally 645, remotely 647 or both locally 645 and remotely 647. As an example, the report circuitry 642 may be configured as a background process where reporting to a user's device is disabled and where reports are issued to a manufacturer (e.g., where a manufacturer monitoring option has been accepted by a user or owner of a device). As an example of both local and remote reporting, consider a GUI rendered to a display of the device and an email sent to the owner or user of the device. Such reporting may occur relatively simultaneously or may occur at different times. For example, a GUI may be rendered once an issue is uncovered by an analysis and an email may be sent if the issue occurs one or more subsequent times (e.g., "please note that a memory usage trend exists that may be addressed by doing XYZ").

Figure 7:
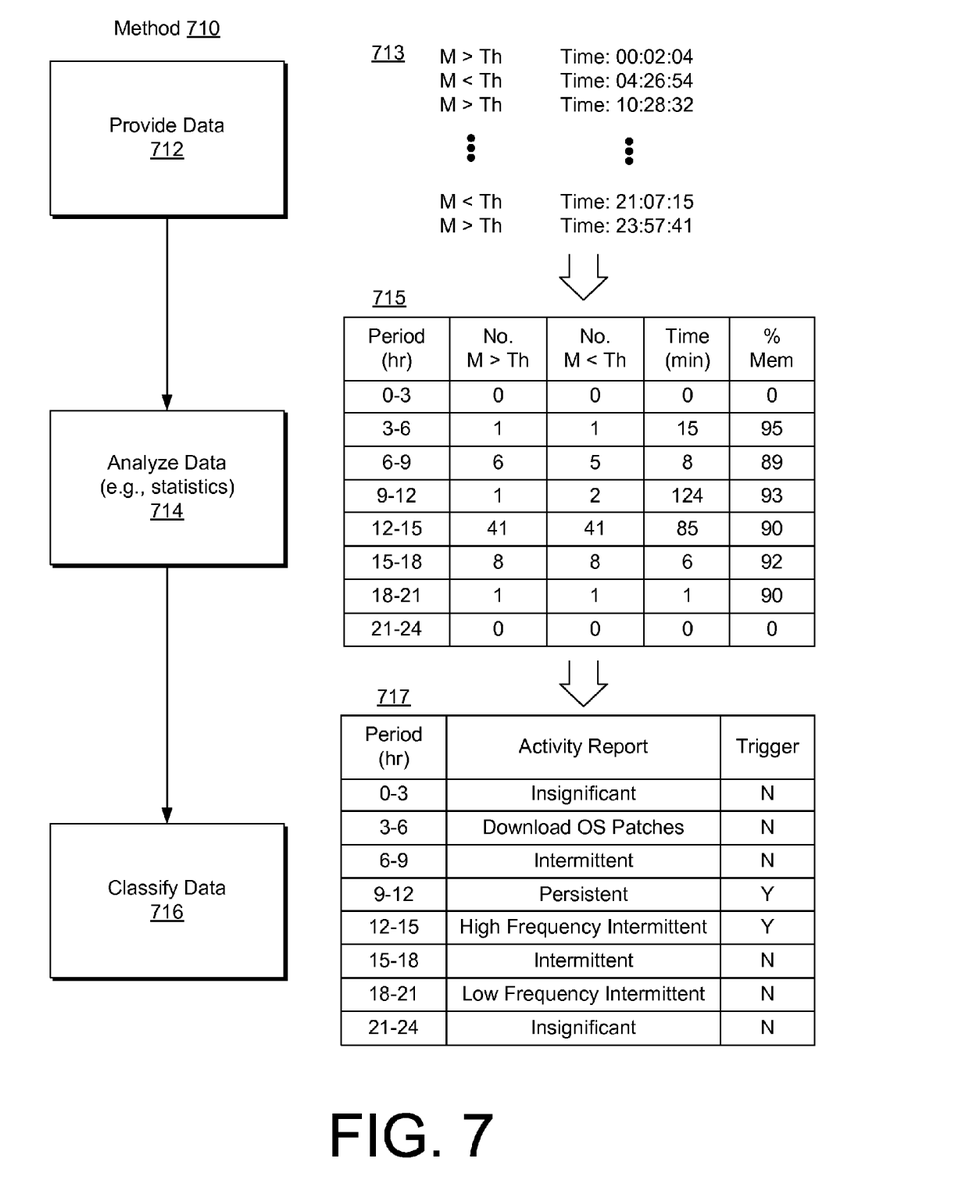
FIG. 7 is a diagram of an example of a method.

FIG. 7 shows an example of a method 710 that includes a provision block 712 for providing data (e.g., optionally data 713), an analysis block 714 for analyzing data (e.g., optionally to provide statistics 715), and a classification block 716 to classify data (e.g., optionally as classified data 717). In the example of FIG. 7, the data 713 includes time information for memory usage with respect to a threshold (e.g., greater than or less than a threshold, etc.). The statistics 715 include number of events based on time period of each event, as well as a total amount of time for memory usage in excess of the threshold and an average percent of memory used during that time. The classified data 717 shows, for each time period, an activity report classification along with a logical trigger (e.g., to trigger action such as issuance of a notification or notifications).

In the example of FIG. 7, the classifications include "insignificant", "download OS patches", "intermittent", "persistent", "high frequency intermittent", and "low frequency intermittent". To classify, the classification block 716 may combine time of day and memory usage pattern. For example, during the time period of 03:00:00 to 6:00:00, which is in the middle of the night, the memory usage pattern shows that memory usage exceed a threshold for a period of fifteen minutes. Logic (e.g., programmed, learned, etc.) may determine that such activity is likely to be associated with installation of one or more OS patches. Accordingly, the classification block 716 may classify that activity as being related to download of OS patches, which does not require triggering of any reporting (e.g., Trigger "N"). As to "high frequency intermittent", at time period 12:00:00 to 15:00:00, this corresponds to 41 events (up and down) for a total time of 85 minutes (e.g., about half of the entire 180 minute time period). As the memory usage, on average, was 93 percent, this activity is classified as being of the type to trigger reporting (e.g., Trigger "Y"). The other type classified as triggering reporting is "persistent", which corresponds to the time period 09:00:00 to 12:00:00, where, although few events, the time is 124 minutes, which is a large fraction of the 180 minute time period.

As to analysis of memory usage information, a method may include analyzing such information for a period of time, for example, by utilizing a calculation involving an exceed time and the period of time (e.g., a monitoring period) where the exceed time is the amount of time that memory usage exceeds a threshold. As to a period of time, it may be, as an example, greater than or equal to two days. A period of time may optionally be determined by a method that aims to distinguish a regular day or days "off", etc. Further, a method may optionally distinguish work time, leisure time, etc. For example, a user may use certain applications at work and other applications at home. For some users, home usage may be more demanding on memory than work usage (e.g., where home usage includes videos, games, etc.). A method may optionally indicate, for example, that usage during "after work" hours would benefit from a memory upgrade (e.g., a notification that reports with respect to time of day or other trend detail).

As described herein, a method may include analyzing memory usage information by utilizing a calculation involving an exceed amount, where the exceed amount is the amount by which memory usage exceeds a threshold. In such an example, if a threshold is set to 50% of total installed memory, the exceed amount may range from about 51% to about 100%. A method may optionally include an upper value where memory usage above that value is no longer distinguished (e.g., once usage reaches 95%, higher values of 96% to 100% may be regarded as having less informational value). As another example, an exceed amount scheme may optionally be tiered (e.g., from 0-10% over threshold, from 11-20% over threshold, etc.).

As described herein, a device, system, etc., may include analysis circuitry to analyze memory usage information for a period of time, for example, by utilizing a calculation involving an exceed time and the period of time, where the exceed time is the amount of time that memory usage exceeds a threshold. In such an example, the period of time may be on the order of two or more days. As another example, a device, a system, etc., may include analysis circuitry to utilize a calculation involving an exceed amount, where the exceed amount is the amount by which memory usage exceeds a threshold.

Figure 8:
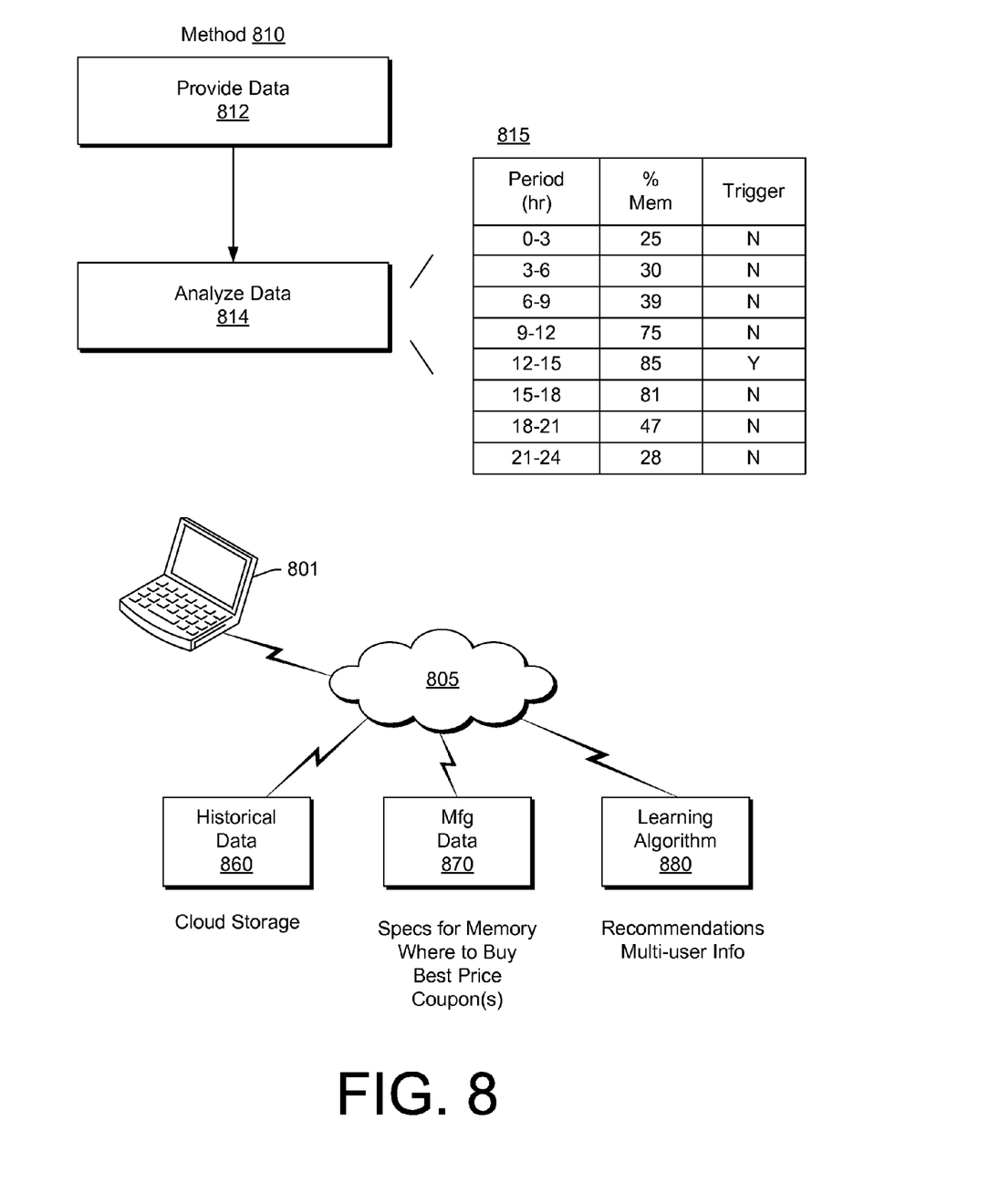
FIG. 8 is a diagram of an example of a method and an example of a device and network resources.

FIG. 8 shows an example of a method 810 that includes a provision block 812 for providing data 812 and an analysis block 814 for analyzing data. In the example of FIG. 8, the analysis block 814 provides for trigger determinations (e.g., Trigger "N" or "Y"), for example, based on average percentage of memory used during a time period. Such a method may rely on data acquired using a call to an API, periodic execution of script, code, etc., to return a value for memory usage. In such a manner, notification circuitry may be controlled (e.g., "Y" triggers a notice).

FIG. 8 also shows an example of a device 801 configured with an interface for communication via a network 805 for access to, for example, historical data 860, manufacturer data 870, or a learning algorithm 880. In such an example, the network may be a local private network, the Internet or other network. The historical data 860 may be data stored in cloud storage. The manufacturer data 870 may include specifications for memory, information as to where to buy memory, best price for memory, coupons, advertising, etc. The learning algorithm 880 may provide for recommendations based in part on memory usage, optionally from multiple users (e.g., using the same or similar device, same or similar configurations, same or similar applications, etc.).

Figure 9:
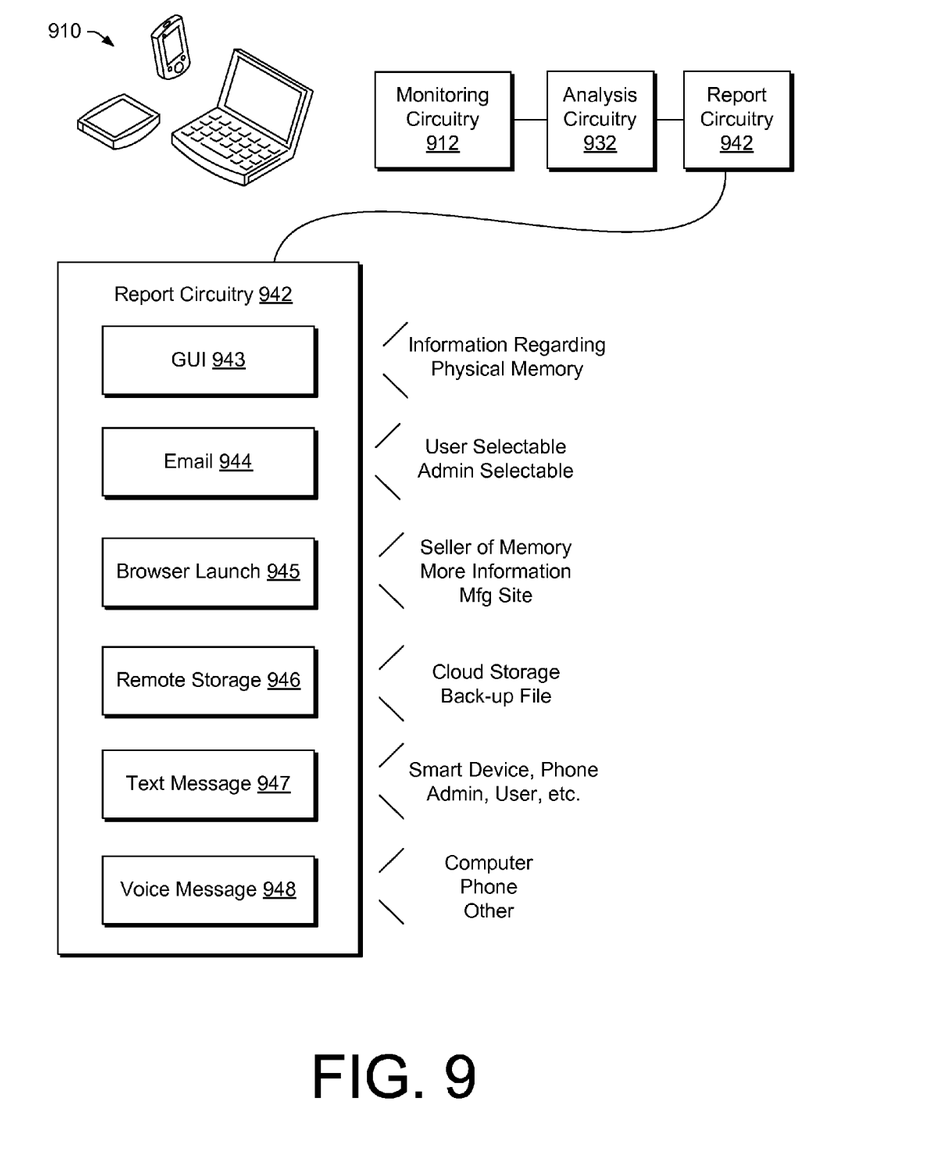
FIG. 9 is a diagram of an example of a system and examples of circuitry.

FIG. 9 shows an example of a device 910 that can include monitoring circuitry 912, analysis circuitry 932 and report circuitry 942. As shown, the report circuitry 942 can include one or more of a GUI module 943, an email module 944, a browser launch module 945, a remote storage module 946, a text message module 947, and a voice message module 948. Such modules can allow the monitoring circuitry 942 to report in an appropriate manner, which may optionally be configured by a user, a device manufacturer, a supplier of memory, an administrator, etc.

While various examples are described with respect to a device such as a notebook computer, devices such as smart devices, cell phones, tablets, etc., may also provide for monitoring and one or more memory upgrade options, for example, by including or operating in conjunction with circuitry such as the circuitry 912, 932 and 942. Such circuitry may optionally be consolidated locally or remotely or distributed locally, remotely or locally and remotely.

As described herein, a method can include receiving memory configuration information that specifies a memory configuration; receiving memory usage information for the memory configuration; analyzing the received memory usage information for a period of time; and, responsive to the analyzing, controlling notification circuitry configured to display a graphical user interface that presents information for physically altering a specified memory configuration. In such a method, memory usage information can include event information (e.g., event information that includes event times for memory usage crossing a memory usage threshold), duration information (e.g., duration information that includes durations for memory usage above the memory usage threshold), etc.

As described herein, information for physically altering a specified memory configuration can include a notification that adding more memory will improve system performance. As to a memory configuration, it may be a RAM configuration, for example, one that specifies that RAM is installed in one or more hardware memory slots (e.g., of a device, a system, etc.).

As described herein, a method can include controlling notification circuitry by issuing an instruction to display a memory upgrade option via a graphical user interface. In such an example, the memory upgrade option may include replacing memory of the memory configuration, adding memory without replacing memory of the memory configuration, or other option. Further, more than one option may be provided, for example, by issuing an instruction to display an additional memory upgrade option via the graphical user interface or other mechanism.

As described herein, one or more computer-readable media can include processor-executable instructions to instruct a computer to: receive memory configuration information that specifies a memory configuration of the computer; receive memory usage information for the memory configuration of the computer; and, responsive to an analysis of the received memory usage information for a period of time, control notification circuitry configured to optionally display information for upgrading a memory configuration of the device. Instructions may also be included to instruct the computer to receive memory usage information as event times for memory usage crossing a memory usage threshold, as durations for memory usage above a memory usage threshold, etc. Instructions may optionally be provided to instruct a computer to adjust a memory usage threshold, to adjust the period of time, etc.

As described herein, a system can include a processor; memory accessible to the processor, the memory having a physical memory configuration; and notification circuitry, responsive to trends in usage of the memory, to call for rendering of a notice to alter a physical memory configuration (e.g., the physical memory configuration of the memory of the system). Such a system may include a display, the notification circuitry, responsive to trends in usage of the memory, to call for rendering the notice to the display. A system may include a network interface where notification circuitry acts in response to trends in usage of the memory to call for accessing a network via the network interface.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 10:
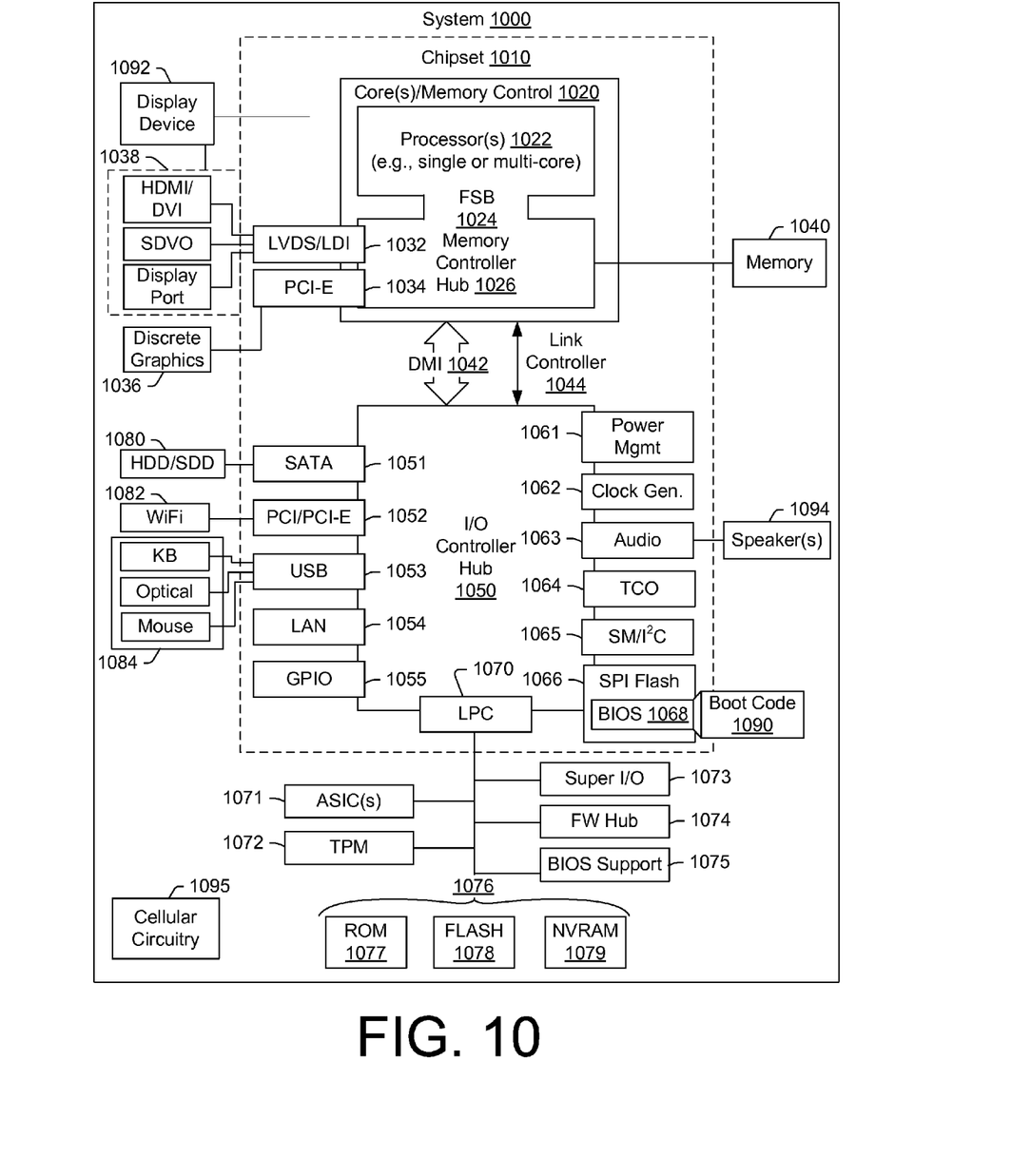
FIG. 10 is a diagram of an example of a system, which may be part of a device.

While various examples of circuits or circuitry have been discussed, FIG. 10 depicts a block diagram of an illustrative example of a computer system 1000. The system 1000 may be a desktop computer system, for example, such as one of the ThinkCentre® or ThinkPad® series or IdeaPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a device may include other features or only some of the features of the system 1000.

As shown in FIG. 10, the system 1000 includes a so-called chipset 1010. A chipset refers to a group of integrated circuits, or chips, that are designed to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory" or "main memory" or "primary memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface. One or more interfaces of the system 1000 may be suitable for receiving, transmitting or receiving and transmitting information with a sensor such as an accelerometer (e.g., to effectuate orientation or other control).

The interfaces of the I/O hub controller 1050 provide for communication with various devices, networks, etc. For example, the SATA interface 1051 provides for erasing, reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), mice and various other devices (e.g., cameras, phones, storage, media players, etc.). As to cellular communication, the system 1000 can include cellular circuitry 1095. Such circuitry may be circuitry suitable for a cell phone or other device that communicates via one or more frequencies (e.g., TDMA, CDMA, GSM, etc.). The system 1000 may optionally include GPS circuitry for GPS communications and GPS functionality.

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a device or other machine may include fewer or more features than shown in the system 1000 of FIG. 10. For example, the device 110 of FIG. 1 may include some or all of the features shown in the system 1000 (e.g., as part of basic or control circuitry).

Conclusion

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   receiving memory configuration information that specifies a memory configuration;
   receiving memory usage information for the memory configuration;
   analyzing the received memory usage information for a period of time; and
   responsive to the analyzing, controlling notification circuitry that calls for display of a graphical user interface that presents information for physically altering a specified memory configuration wherein the specified memory configuration comprises a random access memory configuration for random access memory installed in one or more hardware memory slots.

2. The method of claim 1 wherein the memory usage information comprises event times for memory usage crossing a memory usage threshold wherein memory usage crossing the memory usage threshold comprises an event and wherein a clock time associated with that event is an event time.

3. The method of claim 1 wherein the analyzing the received memory usage information for a period of time utilizes a calculation involving an exceed time and the period of time, wherein the exceed time is the amount of time that memory usage exceeds a threshold.

4. The method of claim 3 wherein the period of time is greater than or equal to two days.

5. The method of claim 1 wherein the analyzing utilizes a calculation involving an exceed amount, wherein the exceed amount is the amount by which memory usage exceeds a threshold.

6. The method of claim 1 wherein the information for physically altering a specified memory configuration comprises a notification that adding more memory will improve system performance.

7. The method of claim 1 wherein the controlling notification circuitry comprises issuing an instruction to display a memory upgrade option via the graphical user interface.

8. The method of claim 7 wherein the memory upgrade option comprises replacing memory of the memory configuration or adding memory without replacing memory of the memory configuration.

9. The method of claim 7 further comprising issuing an instruction to display an additional memory upgrade option via the graphical user interface.

10. One or more non-transitory computer-readable media comprising processor-executable instructions to instruct a computer wherein the instructions comprise instructions to:
receive memory configuration information that specifies a memory configuration of the computer;
receive memory usage information for the memory configuration of the computer; and
responsive to an analysis of the received memory usage information for a period of time, control notification circuitry that optionally calls for display of information for upgrading a memory configuration of the computer.

11. The one or more non-transitory computer-readable media of claim 10 further comprising instructions to instruct the computer to receive memory usage information as event times for memory usage crossing a memory usage threshold wherein memory usage crossing the memory usage threshold comprises an event and wherein a clock time associated with that event is an event time.

12. The one or more non-transitory computer-readable media of claim 10 further comprising instructions to instruct the computer to adjust a memory usage threshold.

13. The one or more non-transitory computer-readable media of claim 10 further comprising instructions to instruct the computer to adjust the period of time.

14. A system comprising:
a processor;
random access memory accessible to the processor, the random access memory having a physical random access memory configuration; and
notification circuitry, responsive to trends in usage of the random access memory at least in part by the processor, to call for rendering of a notice to alter a physical random access memory configuration.

15. The system of claim 14 further comprising a display, the notification circuitry, responsive to trends in usage of the random access memory, to call for rendering the notice to the display.

16. The system of claim 14 further comprising a network interface, the notification circuitry, responsive to trends in usage of the random access memory, to call for accessing a network via the network interface to access information related to the random access memory of the system.

17. The system of claim 14 further comprising analysis circuitry to analyze random access memory usage information for a period of time by utilizing a calculation involving an exceed time and the period of time, wherein the exceed time is the amount of time that random access memory usage exceeds a threshold.

18. The system of claim 17 wherein the period of time is greater than or equal to two days.

19. The system of claim 14 further comprising analysis circuitry to utilize a calculation involving an exceed amount, wherein the exceed amount is the amount by which random access memory usage exceeds a threshold.

20. The system of claim 14 comprising a computer that comprises hardware slots that are in receipt of the random access memory to thereby define in part the physical random access memory configuration of the computer.

* * * * *